United States Patent [19]

Anderson et al.

[11] 4,088,018
[45] May 9, 1978

[54] MAGNETIC SUSPENSION AND POINTING SYSTEM

[75] Inventors: Willard W. Anderson, Yorktown; Nelson J. Groom, White Marsh, both of Va.

[73] Assignee: The United States of America as represented by the Administrator of the National Aeronautics and Space Administration, Washington, D.C.

[21] Appl. No.: 807,703

[22] Filed: Jun. 17, 1977

Related U.S. Application Data

[62] Division of Ser. No. 662,182, Feb. 27, 1976.

[51] Int. Cl.² .............................................. G01C 21/00
[52] U.S. Cl. ..................................... 73/178 R; 308/10
[58] Field of Search ............. 73/178 R, 178 T, 178 H; 308/10; 244/166; 318/648, 649, 653

[56] References Cited

U.S. PATENT DOCUMENTS

| | | | |
|---|---|---|---|
| 3,845,995 | 11/1974 | Wehde | 308/10 |
| 3,875,488 | 4/1975 | Crocker | 318/648 |

*Primary Examiner*—Donald O. Woodiel
*Attorney, Agent, or Firm*—William H. King; John R. Manning; Howard J. Osborn

[57] ABSTRACT

Apparatus for providing accurate pointing of instruments on a carrier vehicle and for providing isolation of the instruments from the vehicle's motion disturbances. The apparatus includes two assemblies, with connecting interfaces, each assembly having a separate function. The first assembly is attached to the carrier vehicle and consists of an azimuth gimbal and an elevation gimbal which provide coarse pointing of the instruments by allowing two rotations of the instruments relative to the carrier vehicle. The second or vernier pointing assembly is made up of magnetic suspension and fine pointing actuators, roll motor segments, and an instrument mounting plate around which a continuous annular rim is attached which provides appropriate magnetic circuits for the actuators and the roll motor segments. The vernier pointing assembly is attached to the elevation gimbal and provides vernier attitude fine pointing and roll positioning of the instruments as well as six degree-of-freedom isolation from carrier motion disturbances.

6 Claims, 4 Drawing Figures

MAGNETIC SUSPENSION AND POINTING SYSTEM

ORIGIN OF THE INVENTION

The invention described herein was made by employees of the United States Government and may be manufactured and used by or for the Government for governmental purposes without the payment of any royalties thereon or therefor.

This is a division of application Ser. No. 662,182, filed Feb. 27, 1976.

BACKGROUND OF THE INVENTION

The invention relates generally to apparatus for pointing the instruments on a carrier vehicle, such as a spacecraft, at a selected target and more specifically concerns apparatus for accurately pointing the instruments on a carrier vehicle at a selected target and for isolation of the instruments from carrier motion disturbances.

Prior devices for pointing the instruments onboard a carrier vehicle includes mechanical isolation and torque motor pointing. Also, prior concepts have included magnetic isolation and pointing but have never used a continuous annular rim providing roll control. The disadvantages of these prior concepts are that they do not provide complete six degree-of-freedom control and isolation simultaneously.

It is therefore the primary purpose of this invention to provide complete six degree-of-freedom fine pointing and control for carrier vehicle instruments and to provide complete six degree-of-freedom isolation of carrier vehicle instruments from disturbances on the vehicle to which the invention is attached.

SUMMARY OF THE INVENTION

This invention includes two assemblies with each having a separate function. The first assembly is attached to a carrier vehicle and consists of an azimuth gimbal and an elevation gimbal which provide coarse pointing of the instruments by allowing two rotations of the instruments relative to the carrier vehicle. The second, or vernier pointing assembly, is made up of magnetic suspension and fine pointing actuators, roll motor segments, and an instrument mounting plate around which a continuous annular rim is attached which provide appropriate magnetic circuits for the actuators and the roll motor segments. The vernier pointing assembly is attached to the elevation gimbal and provides vernier attitude fine pointing and roll positioning of the instrument as well as six degree-of-freedom isolation from carrier motion disturbances. In addition, the second assembly has a rim centering mode in which axial and radial rim position sensors located at each actuator station are used to center the rim axially and radially between actuator pole faces. This mode allows coarse gimbal slewing for re-targeting, for earth pointing or for backup coarse gimbal pointing.

The vernier pointing system includes electromagnets working in opposed pairs axially and either singularly or in opposed pairs radially to provide fine pointing forces on the rim of the instrument mounting plate. The command forces originate from rim position sensors while in the rim centering mode or from instrument pointing error sensors for the axial actuators while in the vernier pointing mode. The radial actuators can be controlled in a manner to reduce the effects of translations of the carrier in the radial direction. Roll positioning is provided by a linear non-contacting roll torque motor which produces forces tangential to the rim. Roll angle is determined from a linear sensor located along the periphery of the rim. Also, roll could be controlled, in a fine pointing mode, from signals generated by a roll sensor on board the experiment package. Thus, it is seen that the instrument mounting plate is completely isolated from the elevation gimbal (no interface connection) and the only forces produced on it, as long as the electromagnet gaps are maintained, are those produced by the electromagnets themselves, in response to command signals.

DETAILED DESCRIPTION OF THE INVENTION

Figure 1:
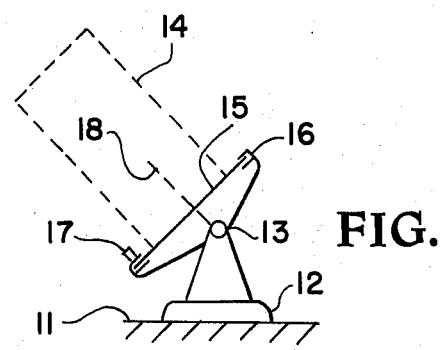
FIG. 1 is a schematic diagram of the invention.

Turning now to the embodiment of the invention selected for illustration in the drawings, the number 11 in FIG. 1 indicates a carrier vehicle on which the invention is mounted. An azimuth gimbal 12 is attached to the carrier vehicle and an elevation gimbal 13 is mounted on gimbal 12. These two gimbals allow two rotations of an instrument package 14 relative to the vehicle and thereby provide coarse pointing of the instruments. Instrument package 14 is mounted on a mounting plate 15 which is magnetically suspended and fine controlled by means of a magnetic controller 16. A roll motor 17 is mounted on gimbal 13 for the purpose of controlling or rotating instrument package 14 about the central axis 18 of mounting plate 15.

Figure 2:
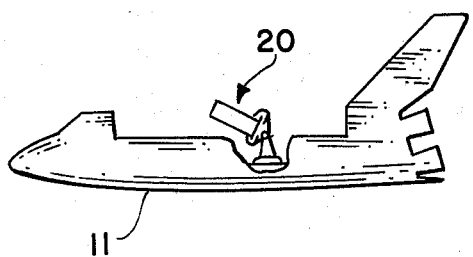
FIG. 2 is a schematic diagram showing the invention mounting on a carrier vehicle.

The apparatus shown in FIG. 1 which is designated by the numeral 20 in FIG. 2 is mounted on a typical carrier vehicle 11 as shown in FIG. 2.

Figure 3:
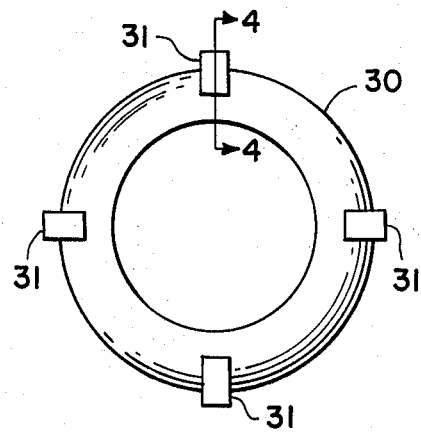
FIG. 3 is a schematic diagram of the annular rim upon which the instruments are mounted.
Figure 4:
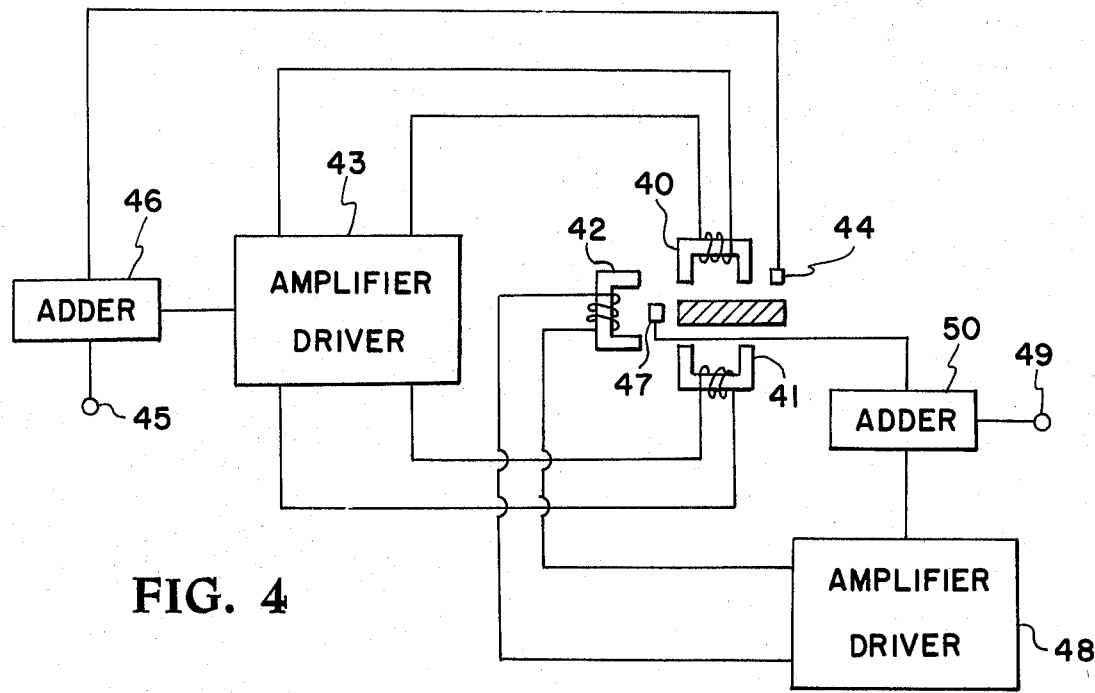
FIG. 4 is a sectional view 4—4 of FIG. 3 with a schematic drawing of the electrical connections made to the actuator.

Mounting plate 15 and magnetic controller 16 shown in FIG. 1 can best be understood by referring to FIG. 3. In FIG. 3 there is shown an annular rim 30 that surrounds the mounting plate 15, not shown. Annular rim 30 is made from a magnetic material such as iron or a composite material including ferrite pieces to provide magnetic circuits for the actuators. In this embodiment of the invention the magnetic controller 16 includes four magnetic actuators 31. However, it is to be understood that three or more of these actuators can be used without departing from the invention. To better describe the actuators, a cross section 4—4 of FIG. 3 is shown in FIG. 4 along with the electrical circuitry connected to the actuators.

Each of the actuators 31 includes an electromagnet 40, an electromagnet 41 and an electromagnet 42. For the described embodiment of the invention the electromagnets do not use permanent magnets; however, they could be used for flux biasing. Electromagnets 40 and 41 which apply forces to opposite sides of rim 30 are connected to an amplifier driver 43 which applies a signal to each of the electromagnets. The signal is applied to electromagnet 40 if the rim is displaced in the direction of electromagnet 41 and vice versa. A transducer 44 is included with each actuator 31 to produce a signal that is proportional to the distance form transducer 44 to the annular rim 30. This signal is applied to the amplifier driver 43 which applies a signal to electromagnets 40 and 41 to maintain annular rim 30 in a fixed neutral position. A signal can be applied to a terminal 45 which is added to the signal from transducer 44 by means of an adder 46 to control the position of annular rim 31 relative to its neutral position. Hence, each actuator 31 includes a magnetic means for magnetically suspending the rim in a direction parallel to axis 18 (axial direction) and for providing a fine control in that direction.

A transducer 47 is located opposite the end of annular rim 30 that produces a signal proportional to the distance from transducer 47 to annular rim 30. This signal is applied to an amplifier driver 48 which applies a signal to electromagnet 42 to maintain the annular rim in a neutral position. A signal can be applied to a terminal 49 which is added to the signal produced by transducer 47 by means of an adder 50 to control the annular rim 30 relative to its neutral position. Hence, each actuator 31 includes a magnetic means for magnetically suspending the rim in a direction perpendicular to axis 18 (radial direction) and for providing a fine control in that direction. It should be noted that if an even number of actuators 31 are used then opposing electromagnets 42 can be connected together electrically. If two of the electromagnets 42 are connected together electrically, then one transducer 47 can be used to control both electromagnets or two can be used with the average output of the two used to control both eletromagnets. In either case, a signal is applied to one electromagnet 42 if the rim is displaced in the direction of the other and vice versa.

Nominal operation of the invention for solar or stellar pointing first involves coarse gimbal pointing using coarse sensors on board the carrier vehicle and relative gimbal angle information. The rim centering is activated during gimbal slewing. After coarse alinement, coarse roll positioning is accomplished using the rim roll motor and a relative roll sensor located on the rim together with a carrier sensor.

After coarse attitude alinement, vernier fine pointing is initiated. For this mode, errors from fine attitude sensors located on the vehicle are nulled by small magnetic suspension and fine pointing actuator torques applied to the annular rim. Also, translational rim control is accomplished for this mode.

Nominal operation of this invention for earth pointing initially involves establishing the correct azimuth, elevation, and roll attitude and attitude rates (slewing) using the rim centering mode. After appropriate smooth instrument slewing is established, vernier pointing, similar to that described for solar and stellar pointing, is accomplished.

Upon completion of a pointing task, the correction of appropriate interfaces between the payload mounting surface and the first assembly takes place. These interfaces can be maintained during a pointing task if the pointing degradation caused by the interface connection is tolerable.

The advantages of this invention are that it provides complete six degree-of-freedom fine pointing and control for carrier vehicle instruments and it provides complete six degree-of-freedom isolation of carrier vehicle instruments from disturbances on the vehicle to which the invention is attached.

What is claimed is:

1. Apparatus for providing accurate pointing for carrier vehicle instruments and for providing isolation from the vehicle comprising:
    a first gimbal attached to and supported by said carrier vehicle;
    a second gimbal mounted on said first gimbal;
    an instrument package; and
    means supporting said instrument package and mounted on said second gimbal for magnetically suspending said instrument package and for fine controlling the pointing of said instrument package whereby fine and coarse control of the pointing of said instrument package is provided the coarse control being provided by said first and second gimbals.

2. Apparatus according to claim 1 wherein said first gimbal is an azimuth gimbal and said second gimbal is an elevation gimbal.

3. Apparatus according to claim 1 wherein said means for magnetically suspending and fine controlling the pointing of said instrument package comprises:
    an annular rim made from a magnetic material for supporting said instrument package;
    several actuator stations located around the periphery of said rim;
    each of said actuator stations comprising: means for magnetically suspending said rim at the actuator station in the direction parallel to the central axis of said rim and for providing fine control in that direction; and
    means for magnetically suspending said rim at the actuator station in the direction perpendicular to the central axis of said rim and for providing a fine control in that direction whereby the combined actuator stations provide a fine control of said instrument package in five degrees-of-freedom.

4. Apparatus according to claim 3 including means for turning said rim about said central axis to a selected position whereby fine control of said instrument package is provided in six degrees-of-freedom.

5. Apparatus according to claim 3 wherein said means for magnetically suspending said rim in a direction parallel to the central axis of said rim includes first and second electromagnets located opposite each other on two sides of said rim; a transducer on one side of said rim for producing an electrical signal proportional to its distance from said rim; amplifier means receiving said electrical signal for applying the amplified electrical signal to said first and second electromagnets to maintain said rim in a neutral position in said direction parallel to the central axis of said rim; and means for adding a control signal to said electrical signal whereby a fine control can be maintained by said control signal in said direction parallel to the central axis of said rim.

6. Apparatus according to claim 3 wherein said means for magnetically suspending said rim in a direction perpendicular to the central axis of said rim includes an electromagnet located opposite the edge of said rim; a transducer located opposite the edge of the rim for producing an electrical signal proportional to the distance of the transducer from the rim; amplifier means for amplifying said electrical signal and applying it to said electromagnet to maintain said rim in a neutral position in a direction perpendicular to said central axis of said rim; and means for adding a control signal to said electrical signal whereby a fine control can be maintained by said control signal in said direction perpendicular to the central axis of said rim.

* * * * *